(12) United States Patent
Bailey et al.

(10) Patent No.: US 6,323,455 B1
(45) Date of Patent: Nov. 27, 2001

(54) SEPARATION OF ISOTOPES BY IONISATION FOR PROCESSING OF NUCLEAR FUEL MATERIALS

(75) Inventors: Geoffrey Horrocks Bailey, Preston; Colin Whitehead, Clywd; David John Witts, Chester, all of (GB)

(73) Assignee: British Nuclear Fuels PLC, Cheshire (GB)

( * ) Notice: Subject to any disclaimer, the term of this patent is extended or adjusted under 35 U.S.C. 154(b) by 0 days.

(21) Appl. No.: 09/142,737

(22) PCT Filed: Mar. 12, 1997

(86) PCT No.: PCT/GB97/00676
§ 371 Date: Apr. 19, 1999
§ 102(e) Date: Apr. 19, 1999

(87) PCT Pub. No.: WO97/34685
PCT Pub. Date: Sep. 25, 1997

(30) Foreign Application Priority Data

Mar. 15, 1996 (GB) .................................................. 9605435
May 21, 1996 (GB) .................................................. 9610606
Feb. 27, 1997 (GB) .................................................. 9704077

(51) Int. Cl.[7] .................................................. B23K 9/00
(52) U.S. Cl. .............................. 219/121.59; 219/121.43; 219/121.36; 219/121.55; 250/292; 250/282; 250/284
(58) Field of Search ................ 219/121.43, 121.55, 219/121.52, 121.59, 121.36; 204/298.12; 376/409; 250/290–295, 283, 284; 156/345

(56) References Cited

U.S. PATENT DOCUMENTS

| | | | |
|---|---|---|---|
| 3,992,625 | * 11/1976 | Schmidt et al. | 250/284 |
| 4,090,855 | * 5/1978 | Hora et al. | 55/2 |
| 4,093,856 | 6/1978 | Stenzel . | |
| 4,167,668 | 9/1979 | Mourier . | |
| 4,208,582 | 6/1980 | Arnush . | |
| 4,213,043 | 7/1980 | Dawson . | |

OTHER PUBLICATIONS

Isotope Separation by Ionic Cyclotron Resonance, P. Louvet, Workshop on Separation Phenomena in Liquids and Gasses, Darmstadt, Jul. 20–23, 1987.

Study of Selective Heating at Low Cycloron Resonance for the Plasma Separation Process, A. Compant LaFontaine and Pashkovsky, VG, Phys. Plasmas 2, American Institute of Physics, Dec. 12, 1995.

Ion Cyclotron Resonance Heating for the Plasma Separation Process, A. Compant LaFontaine, 1994, American Institute of Physics.

* cited by examiner

Primary Examiner—Mark Paschall
(74) Attorney, Agent, or Firm—Workman, Nydegger & Seeley

(57) ABSTRACT

Processing apparatus and methods are provided which involve the selective ionization of a feed material; the separation of ionized and non-ionized species; a selective excitation of the still ionized species; introduction of a chemical material to cause selective transition to a non-ionized state of part of the feed; and a further separation of ionized and non-ionized species. Other improvements in selective excitation based processing are also disclosed. Separation of isotopes and/or elements from one another and changing chemical and physical form is provided in a single process from a variety of feeds.

40 Claims, 8 Drawing Sheets

SEPARATION OF ISOTOPES BY IONISATION FOR PROCESSING OF NUCLEAR FUEL MATERIALS

BACKGROUND OF THE INVENTION

1. Field of the Invention

This invention concerns improvements in and relating to processing, particularly, but not exclusively to the processing of nuclear fuel materials.

2. Present State of the Art

The production of fuel grade nuclear fuel from mined uranium ore is a long and complex process. Many variations in the process are known but in general terms the process involves taking the ex-mine grade material and gradually converting and enriching it until it is in. a form and of a grade suitable for producing fuel pellets. Stages in this process are the concentration of the initial uranium oxides as uranyl nitrate hexahydrate; a de-nitration stage to convert the material into $UO_3$; a reduction stage to convert the $UO_3$ to $U_2$; a hydrofluorination stage to form $UF_4$; a further fluorination stage to produce $UF_6$; an enrichment procedure by physical or chemical means; and the conversion of $UF^6$ in its enriched form to ceramic grade $UO_2$ which is in a suitable form to be formed into fuel pellets.

Substantial processing plants, in terms of their size, capital investment and running costs, are necessary to perform all of these stages. Transportation between the various stages with its attendant problems are encountered. In addition, the fluorination technique in particular requires a complex and hazardous electrolysis process to produce the fluorine required.

Recycling of fuel similarly involves a series of complex chemical and physical steps to separate the various fission products from the depleted fuel and to upgrade the $^{235}U$ concentration in the material to a stage where once again it can be employed as fuel.

The complexities of these processes are also present in other processing lines in the fuel cycle, in relation to thorium, plutonium and other materials for instance.

BRIEF SUMMARY OF THE INVENTION

According to a first aspect of the invention we provide a process comprising the steps of:

a) providing a feed, the feed consisting of mixed components;

b) introducing said feed into a magnetic field;

c) converting at least a portion of said feed into an ionised form;

d) providing at least a portion of at least one component at a first energy band and/or level and providing at least a portion of at least one component at a second energy band and/or level, the second energy band and/or level being higher than the first energy band and/or level; and e) at least partially separating said first energy band and/or level components from said second energy band and/or level components.

The ionisation may be controlled to provide at least one component in a partially ionised form and at least one different component in at least partially non-ionised form.

The non-ionised components may be separated from the ionised components. Preferably the separation occurs prior to the passage of the feed to the selective excitation stage. Preferably the ionised components for feed to the selective excitation stage are neutralised prior to introduction to the containing magnetic field of the selective excitation stage. Preferably the feed is at least partially ionised prior to the selective excitation, once within the containing magnetic field.

Further details of the process incorporating selective ionisation and a separation based thereon are set out in the second aspect of the invention and are incorporated herein.

The separation of the high energy level components from the low energy level components may be affected by contacting these components with a chemical material, the contact resulting in the higher energy level components remaining in a still ionised form and the contact with the lower energy level components resulting in an uncharged form. Preferably a separation of the components is then made based on the charge difference.

Further details of the process in which separation is based on a selective chemical quench are set out in the fifth aspect of the invention and are incorporated herein.

Preferably the feed to the process is provided in solid, most preferably powdered form, and/or in liquid form.

Preferably the feed comprises a mixture of isotopes. One or more isotopes of different elements may be present and/or one or more different isotopes of the same element may be present. Feed containing $^{238}U$ and $^{233}U$ is particularly preferred. A feed containing $^{238}U$, $^{235}U$, $^{241}Pu$ and $^{239}Pu$, potentially together with other isotopes of Pu and other elements is also preferred.

Preferably one or more, and most preferably all, of the isotopes are present in molecular form in the feed. The provision of the uranium isotopes in oxide form and optionally in dioxide form is envisaged.

Preferably the materials are fed to the selective excitation stage as an at least partially ionised gas. The conversion of the feed material into an at least partially ionised gas may be affected in a single stage, for instance a plasma generator. Alternatively the feed materials may be first converted into a gas or vapour and then subsequently at least partially ionised.

Preferably the feed, which may be solid, is introduced into heating means, the heat input resulting in vaporisation and/or evaporation and/or the provision of the solid as a gas. A furnace may be employed for this purpose. The heat input may be provided by means of radiation and/or microwave heating.

A waste stream, for instance consisting of non-volatile or less volatile material, may be extracted from the heating means.

Preferably the feed in vapour form passes in a counter current manner to the feed in solid form in the heating means.

Preferably the feed is introduced into a magnetic field prior to ionisation. The magnetic field may be configured so as to confine the ionised part of the feed after ionisation. Preferably the feed is introduced to the magnetic field as a non-ionised vapour or gas.

The feed in gas form may be converted to an at least partially ionised state by ionising means. Electron cyclotron resonance offers a particularly suitable means for ionising or part ionising the feed.

Selected components of the feed may be substantially completely ionised and/or selected components of the feed may remain substantially un-ionised.

In one embodiment it is preferred that substantially all the components containing a given element are ionised. For instance both the $^{238}U$ and $^{235}U$ components of the feed may be converted to ionised form.

Preferably one or more components of the feed are converted to ionised form, in a molecular state. The conversion of the metal oxide to metal oxide ions, such as $UO_2$, to $UO_2^+$, is particularly preferred in this regard. Details and options for the selective excitation of the feed, whether as elemental or molecular ions, are provided elsewhere in the application.

The higher energy level components may be collected by collecting means presented to the process flow. Preferably the lower energy level components pass the collector means to separate, subsequent collector means.

Preferably the collector means for the high energy level components comprises a collector grid. The grid may comprise a series of plates. Preferably the plates are arranged substantially parallel to the direction of feed flow.

Preferably the collector means are electrically earthed or provided with an electrical potential.

The electrical potential preferably acts to neutralise the high energy level components from their ionised to an un-ionised state.

The collector means may be provided at a temperature of below 1000K. In this way cooling ot the high energy level components from a gaseous to a liquid, or more preferably, solid state is provided.

Preferably the collector means can periodically be removed from the feed flow, particularly to a remote location. Preferably the product is removed from the collector grid at this remote location. Preferably an alternative portion on the collecting grid is presented to the feed flow, when an alternative portion of the collector means is having the product recovered from it.

Preferably the low energy level components impact on their collector means. The low energy level collector means may comprise a cooled drum. The drum may be rotated and/or a scraper element may be provided to remove the collected low energy level product from the collecting means.

The process may be used to separate $^{235}UO_2$ from a mixture of $^{235}UO_2$ and $^{238}UO_2$. The process may be used to separate $^{235}UO_2$ from a mixture of $^{238}UO_2$, $^{235}OU_2$, and compounds of $^{241}Pu$ and/or $^{239}Pu$. The process may also be used to remove fission products from spent nuclear fuel. The process may also be used to remove specific Pu and U isotopes from spent nuclear fuel, to facilitate recycle.

Other details, options and possibilities for the feed material, its ionisation, its selective excitation and its separation are set out elsewhere in the other aspects of the invention and in the specific description. These possibilities are equally applicable to the first aspect of the invention.

According to a second aspect of the invention we provide a process comprising the steps of:

a) providing a feed, the feed consisting of mixed components;

b) converting said feed into an ionised/plasma form;

c) providing at least one component in at least partially ionised form and at least one different component in at least partially non-ionised form;

d) containing said ions/plasma in a magnetic field; and e) at least partially separating said ionised components from said non-ionised components.

The component desired may be extracted from a mixture of isotopes and elements of both metal and non-metal nature. The provision of the feed in a nitrogen containing compound is particularly preferred. Feed material consisting of uranyl nitrate, uranium hexafluoride, plutonium nitrate, thorium nitrate, depleted uranyl nitrate, depleted uranium hexafluoride or mixtures thereof all represent suitable feed materials. These materials may be in hydrated form.

The feed materials may be introduced as gases, liquids or solids to the plasma generator.

The feed material may contain the desired component in levels below 1.5%, 1% or even below 0.5%. Thus no enrichment of the material is necessary before it can be fed to this process.

The mixed components may consist of two or more different elements; two or more different isotopes of the same element; different elements together with different isotopes of one or more of those elements; or compounds incorporating different elements, different isotopes or different isotopes and different elements, and reference in this application to the term components should be taken to include all such possibilities, amongst others, unless stated to the contrary.

Preferably all, or substantially all, of a given component is ionised. Preferably all, or substantially all, of a given component is not ionised.

Preferably some or all metallic elements present in said feed are ionised. The ionisation of metallic elements with an atomic weight greater than 90 is particularly preferred. Preferably some or all non-metallic elements in said feed are not ionised. Preferably all elements with an atomic weight below 90, and most preferably 70 and ideally below 60, are left in non-ionised form. It is particularly preferred that elements such as uranium and/or plutonium and/or thorium and/or gadolinium are ionised. It is preferred that elements such as hydrogen and/or fluorine and/or oxygen and/or nitrogen are not ionised. Preferably boron is not ionised.

The ionisation of the components may be caused by the temperature of the plasma. Additionally or alternatively the ionisation of the components may be caused by the interaction of the components with high energy electrons produced by electron cyclotron resonance. The extent of ionisation and/or components ionised may be controlled by the energy input of the electron cyclotron resonance.

In a particular embodiment, therefore, the plasma may convert the feed materials to discrete atoms and electron cyclotron resonance may subsequently give rise to at least partial ionisation, preferably of a selective nature.

The temperature of said plasma may be controlled to provide selective ionisation of the components in the desired way. Thus the plasma may ionise some components in the feed but leave other components, such as fission products and/or non-metallic elements un-ionised.

Preferably said plasma is provided at 3000 to 4500K. Preferably said plasma is generated by microwave or radio frequency means.

Additionally or alternatively the residence time of the feed within the plasma prior to the separation may be controlled to provide selective ionisation of the components in the desired way.

Preferably the magnetic field is provided as a containment field most preferably in an axial alignment. Field strengths in excess of 0.1 tesla may be used for this purpose.

The magnetic field may be configured to define a cylindrical active volume in which the plasma is processed. Preferably the plasma passes along the axis of this containment area from the feed/plasma generation to the next separation stage.

Preferably the separation of ionised and un-ionised components affected by removing the un-ionised component from the plasma, most preferably as a gas. The un-ionised components may be pumped away from the ionised component. The ionised component is contained and hence restrained by the magnetic field.

The separated un-charged components may be subjected to further processing. This may include further selective ionisation and/or selective excitation processing using the techniques set out herein.

Preferably the process comprises an additional stage comprising a selective excitation process and-more preferably the further stage of applying an oscillating electric field to the ionised component, the oscillating electric field having a component perpendicular to the axis of the magnetic field, the electric field oscillating at a frequency close to the ion cyclotron frequency, or an harmonic thereof, of one or more components or one or more isotopes of a component present. Frequencies in the range 30 to 700 kHz may be employed.

Alternatively, two different frequencies in the order of GHz may be employed with a frequency difference close to the ion cyclotron frequency, or a harmonic thereof, i.e. in the kHz range.

Preferably the frequency of field oscillation is close to the ion cyclotron frequency, or an harmonic thereof, of one or more of $^{235}U$, $^{239}Pu$, $^{241}Pu$.

A multiphase helical coil arrangement may be used to impart the oscillating electric field. Thus where four coils are provided they are phased at 90° to one another and the electric field is caused to rotate at a frequency corresponding to the desired level.

Preferably the cross sectional diameter of the plasma column is larger than the maximum diameter helical orbit of the component or isotope to be separated.

The magnetic field strength over the portion where the oscillating electric field is applied is preferably held uniform. Preferably the magnetic field is generated by super conducting magnets. A field strength of between 0.5 and 10 tesla, preferably 1 to 6 tesla, may be provided in this area.

Preferably the oscillating electric field is provided by a radio frequency aerial.

One or more frequencies of oscillation may be applied corresponding to the ion cyclotron or hybrid frequency, or an harmonic thereof, of one or more than one isotope of one or more than one component; or one or more than one component.

Preferably the kinetic energy level of the selected component, element or isotope is elevated to a level significantly above that of the unselected component, element or isotope.

Preferably the kinetic energy level of the higher energy component is at least 1.5 and preferably between 2 and 4 times that of the lower energy component.

The higher energy level component may be within the range 3 to 30 eV, around 20 to 30 eV for instance.

Preferably the low energy element is restricted to a kinetic energy level of less than 10 eV and preferably less than 5 eV.

Preferably the ionised components leaving the selective ionisation/separation process and forming the feed to the selective excitation process is neutralised before entering the containing magnetic field for the selective excitation process.

The feed may be neutralised by contact with a cool material, preferably a gas. The contact may affect the discharge of the component and a chemical alteration, for instance the combination of the component with the cool material or a part thereof. The cool material .ay be oxygen gas. The cool material may combine with the feed to give compound ionised forms of the feed. Compound ionised forms of the feed may be more readily neutralised than atomic or elemental ions of the feed. The compound form may be neutralised by combination with free electrons within the plasma. A component of the compound may be given off by the compound form of the feed on neutralisation.

Alternatively or additionally the feed may be neuzralised by a loss of energy to its environment, for instance radiation cooling, resulting in the feeds reversion to uncharged form.

The feed is preferably discharged but remains in a vapour form. The feed may be present as or converted to atomic, elemental or compound gaseous form.

The containing magnetic field for the selective ionisation process and the containing magnetic field for the selective excitation process are preferably discrete or substantially discrete.

Preferably the feed is at least partially ionised, and more preferably completely ionised, having entered the containing magnetic field for the selective excitation stage.

Preferably the process further comprises the step of introducing chemical material to the plasma the chemical material interacting with the components so as to leave a component of the feed in charged form and a component of the feed in un-charged form. Preferably a separation is effected based on the charged and uncharged forms.

Preferably the chemical material is added at a predetermined kinetic energy level.

It is particularly preferred that the chemical material added at a predetermined kinetic energy level comes into contact with the high energy component and into contact with the low energy component; the kinetic energy levels of the chemical material, high energy component and low energy component being such that contact between the ionised high energy component and the chemical material results in a charged ion of, or including, that component; and the coming together of the low energy ionised component and the chemical material results in an uncharged particle of, or including, that component. It is particularly preferred that the un-charged particle be formed of the low energy component in combination with the added chemical material or a part thereof.

Preferably the conversion of the low energy component to an uncharged state is more rapid than the conversion of the high energy component to an uncharged state.

The conversion from charged to uncharged state may arise in a molecular form of the component. The component to be converted may combine with the, or a part of the, chemical material whilst in still charged form. The conversion may result in loss of a constituent or part of a constituent from the component converted. Loss of part of, or a proportion of, the chemical material may occur in conversion. Preferably the residence time or path is controlled to provide conversion of a predominant part of one component and avoid conversion of a predominant part of the other component.

The chemical material is preferably selected to give the desired uncharged particle and/or end product.

Oxygen represents a particularly preferred chemical material.

Preferably the added chemical material is provided at 100 to 2500K, particularly at 100 to 500K.

The amount of the chemical material added to the process may be selected to control the extent to which the low energy component is converted to the un-ionised form. Thus by providing insufficient of this chemical material to contact all the low energy component a proportion of the low energy component will remain ionised.

The ionised and un-charged components are both preferably maintained as gases following the contact with the added material.

The process may further comprise the step of the charged and un-charged components being separated from one another.

Preferably the charged component is retained within the magnetic field. Most preferably the un-charged component is removed, for example by pumping out, of the magnetic field.

It is preferred that the removed stream be kept at a temperature high enough to minimise condensation of the removed component within the process stream. Condensation in the separated stream may be permitted.

The separated un-charged components may be subjected to further processing. This may include further selective ionisation and or excitation processing using the techniques set out herein.

Where the added chemical material is restricted in the quantity added only a proportion of the particular component may be removed at this stage as un-charged particles.

Preferably the charged component is retained within the magnetic field as it continues beyond this separation stage.

Preferably the method comprises the further step of introducing a further chemical material, preferably at a given kinetic energy level, and contacting this with the remaining charged component, the kinetic energy level of the charged component and chemical material being such that an un-charged component or particle results. Most preferably the component is still present as a gas.

Preferably the further chemical material consists of a material selected to give the desired uncharged particle and/or end product, such as oxygen as the chemical material. Preferably the further chemical material is added at a temperature of between 100K and 2000K and particularly 100K to 500K. Preferably the component and further chemical material are combined in the resulting particle. An oxide represents a particularly preferred form.

Preferably the temperature of the combined form is controlled so as to provide the particle in the desired form. A temperature of 2500K is particularly preferred with uranium so as to present the uranium as gaseous $UO_2$ as the principle form.

Preferably a final step is provided in which further additional chemical material is added to the un-charged component so as to reduce the kinetic energy level to a stage where a solid product is produced. Alternatively or additionally the kinetic energy level reduction can be provided by impacting the uncharged component on a surface, preferably a cooled surface. Preferably the kinetic energy level reduction for the un-charged particle occurs very rapidly so as to avoid undesired intermediate equilibrium forms of the product. A transition period of <2 ms is preferred.

The material may be the same or different from that previously added.

The quantity and/or energy level and/or chemical material and/or collection surface can all be controlled to provide the desired product form, chemical composition, size distribution and shape.

Preferably the product of the process is the desired compound, element or isotope and preferably at the desired grade. Ceramic grade metal oxide is a particularly preferred product of the process although pure metal can also be produced in this way. A ceramic grade metal oxide, for fuel use, is one capable of sintering to give fuel pellets. The particle size and shape necessary to achieve this aim can be readily determined by routine experimentation. Where U+ and/or UO+ species are selectively excited the amount of oxygen added and/or its energy level and/or the collection surface and/or collection surface temperature provided can be controlled to give the desired ceramic grade metal oxide product. Where UO2+ and/or UO+ species are selectively excited the collection surface and/or collection surface temperature can be controlled to give the desired ceramic grade metal oxide product.

Uranium, plutonium, thorium and indeed MOX products can be produced by controlling the process conditions.

According to a third aspect of the invention we provide separation apparatus, said apparatus comprising:
 a) magnetic field generating means;
 b) means for converting at least a portion of the feed to the apparatus into an ionised form;
 c) means for selectively exciting at least a portion of at least one component of the feed to a first energy band and/or level and providing at least a portion of at least one second component at a second energy band and/or level, the second energy band and/or level being higher than the first energy band and/or level; and
 d) means for at least partially separating the first energy band and/or level components from the second energy band and/or level components and wherein the magnetic field contains the ionised feed.

Only partial ionisation of the feed or of certain components of the feed or the complete ionisation of only certain components of the feed may be provided. The non-ionised components may be separated from the ionised components. Further details of apparatus suitable for selectively ionising and/or separating the feed are set out in the fourth aspect of the invention and are incorporated herein.

Further details of the apparatus for selectively increasing the kinetic energy level of one or more components passing through the apparatus are also set out in the fourth aspect of the invention and incorporated herein.

Further details of the separating means for splitting the first energy level components from the second energy level components are also presented in the fourth aspect of the invention and are incorporated herein.

The ionising means may comprise a single stage ionisation unit, for instance a plasma generator. Alternatively ionisation of the feed materials may be affected by the provision of heating means. Preferably the heating means convert the feed material into a gas or vapour. Preferably separate, subsequent ionising means for the gas are provided. The heating means may comprise a furnace, radiation heater or microwave heating device.

Preferably the feed material is introduced into the magnetic field prior to ionisation. Further details of the magnetic field generating apparatus are provided in the fourth aspect of the invention and incorporated herein.

Ionisation, or partial ionisation of the feed may be effected by electron cyclotron resonance means.

The selective excitation of the feed, where there is elemental and/or atomic and/or molecular ions, may be effected by ion cyclotron resonance.

According to a fourth aspect of the invention we provide separation apparatus, said apparatus comprising:
 a) a plasma/ion generator;
 b) means for selectively ionising the feed material of mixed components;
 c) magnetic field generating means producing a magnetic field for containing the plasma ions; and
 d) means to remove un-charged components from the magnetic field.

Preferably the plasma is generated by microwave or radio frequency heating.

Preferably the plasma is heated to between 3000 and 4500K and most preferably 4000K+ or −10%.

The plasma generator may act as the means for selectively ionising the feed material mixed components. Alternatively or additionally high energy electron collisions produced by electron cyclotron resonance means may provide the means for selectively ionising the feed material of mixed components.

The containing magnetic field may be axially aligned.

Preferably the magnetic field generating means comprises one or more super conducting magnets. Preferably the magnets are provided in an annular or cylindrical assembly. In this way a central containment area is defined by the magnetic field, preferably of cylindrical configuration.

Preferably the means for removing un-charged components comprise a pump unit.

Preferably the apparatus further comprises means for selectively increasing the kinetic energy level of one or more components passing through the apparatus. Most preferably this means comprises a radio frequency aerial arranged to provide an oscillating electric field with a component perpendicular to the axis of the magnetic field.

Preferably the kinetic energy levels of the selected components are increased to more than 3 eV and preferably more than 10 eV.

Preferably the unselected components are provided with kinetic energy levels of less than 10 eV and preferably less than 3 eV.

Preferably the kinetic energy level of the selected component is at least 1.5 and preferably between 2 and 4 times that of the unselected component.

The kinetic energy level of the selected component is preferably increased by applying the oscillating electric field at a frequency close to the cyclotron resonance frequency, or a harmonic thereof, for the selected component.

More than one frequency of oscillating field may be applied so as to increase the kinetic energy level of more than one of the components. Different components may have different extent of kinetic energy level increase, i.e., three or more distinct energy levels for the components.

The apparatus may further provide means for introducing chemical material to the magnetic field to cause a selective chemical reaction or phase change. The selection may arise as a result of a kinetic and/or equilibrium effect. A selective chemical reaction preferably results in at least one of the components remaining in a charged state and at least one of the components being converted to an un-charged state.

The chemical material added may be selected to give the desired un-charged particle and/or end product. The chemical material added may be oxygen. Preferably the chemical material is added at a temperature of between 100K and 2000K and most preferably 100K to 500K. The energy level, in terms of temperature and/or mass, of the added chemical material is preferably predetermined to give the desired effect.

Most preferably the conversion of one component is kinetically preferably to the conversion of the other component to uncharged form. Preferably a molecular form uncharged component results. An intermediate charged molecular form may be provided.

Preferably the preferential conversion of one component relative to the other is controlled by the residence time or path provided.

The level of the chemical material introduction can be controlled to be in excess of the component to be altered to the un-charged state to give complete conversion or present as a fraction of the component to be changed. Both charaed and un-charged components are preferably retained as gases.

Preferably the apparatus also provides further means for removing un-charged particles. The further means for removing un-charged particles are preferably axially displaced from the first. Preferably the un-charged particles are kept at in excess of 2000K in the discharged stream.

The apparatus may further provide addition means for a further chemical material to the remaining process stream. Preferably the further chemical material introduced is oxygen. It is particularly preferred that the further chemical material added provides a quenching action to the remaining components. Preferably the further chemical material on contacting the remaining components converts it from a charged to an uncharged phase. Most preferably the component is still retained in the gaseous state following this change.

In a particularly preferred embodiment the addition of oxygen is employed as the further chemical material. Preferably this is introduced at 100 to 500K to give an approximate combined temperature of 2500K in combination with the charged component. At this temperature for instance, U is retained as an un-charged gas primarily in the form $UO_2$.

A still further means for addition of a yet further chemical material may be provided. Preferably this further addition converts the process stream from a gaseous to solid state. Alternatively or additionally the kinetic energy level reduction can be provided by impacting the uncharged component on a surface, preferably a cooled surface. The conversion is preferably obtained very rapidly indeed so as to restrict any intervening equilibrium states forming. Preferably the product is a ceramic grade fuel material, such as $UO_2$.

According to a fifth aspect of the invention we provide a process for separating one or more components at elevated kinetic energy levels from one or more components at lower kinetic energy levels, the process comprising providing a process stream containing the first and second energy level components; introducing a chemical material to the process stream and wherein the introduced chemical material contacts both the first and second energy level components; contact with the higher level kinetic energy level components resulting in a still ionised form of that component and contact with the lower kinetic energy level component resulting in an un-charged form of that component.

Preferably the conversion of one component, most preferably the lower energy component, to uncharged form is kinetically preferable to conversion of the other, most preferably higher energy component. The converted component may be converted to a molecular charged form as an intermediate. Preferably the molecular form involved the added chemical material. The conversion from charged to uncharged may occur in a molecular state. The conversion may involve the loss of part of, or a proportion of the chemical material from the converted component.

Preferably the preferential nature of the conversion is controlled by controlling the residence path and/or time of the contact.

The charged and un-charged component may then be separated one from the other by suitable means. Such means include containing the charged component within a magnetic field and pumping the un-restrained un-charged component from that field. Other possibilities include attracting the charged component towards suitable electrodes.

Preferably the introduced chemical material is in a gaseous state. Preferably this chemical component is un-ionised. Preferably the chemical component is at a temperature of 100 to 2500K and most preferably 100K to 500K. Preferably the chemical material reacts with the low energy level component. Introduction of oxygen as the chemical material is particularly preferred. Reaction of the lower energy level component with the oxygen to give an oxide is one preferred form for the selective chemical reaction.

The provision of the higher energy level components at an kinetic energy level in excess of 3 eV and preferably in excess of 10 eV and the provision or the lower energy level particles at a kinetic energy level less than 10 eV and preferably less than 3 eV is preferred to obtain the desired chemical reactions with the lower kinetic energy particles. The higher energy level component is preferably at least 1.5 and more preferably between 2 and 4 time the energy level of the lower energy level component.

According to a sixth aspect of the invention we provide apparatus for separating one or more components at elevated kinetic energy levels from one or more components at lower kinetic energy levels, the apparatus comprising means for producing the components at elevated and lower kinetic energy levels, means for containing the components produced and means for introducing to the components a chemical material, the chemical material undergoing a selective interaction with the components of first and second energy levels so as to result in one of the energy level components having a still ionised form and the other having an un-ionised form.

Preferably the interaction is a chemical reaction with one of the components. Preferably the interaction is kinetically preferably for one of the components relative to the other.

The elevated and lower energy level for the components may be provided using ion cyclotron resonance.

The components may be subjected to a uniform magnetic field during the provision of the different energy levels. A containing magnetic field may be provided during further processing.

Preferably the added chemical component consists of an un-ionised gas. Oxygen is a particularly preferred form.

According to a seventh aspect of the invention we provide components, materials, elements, or isotopes, or further processed forms thereof, separated according to the methods of the first, second, or fifth aspect of the invention and/or using the apparatus of the third, fourth or sixth aspects of the invention.

Preferably the separated component is one or more isotopes which have been separated from other isotopes of the same and/or other elements, $^{235}$U, $^{241}$Pu and $^{239}$Pu represent such materials.

It is particularly preferred that the product be a ceramic grade metal oxide suitable for nuclear fuel use.

The separated components may alternatively be different elements present in the feed material. Thus the separation of uranium from fluorine is envisaged as is the separation of other elements present in a given compound from each other.

The degree of separation between the components may be substantially complete or only partial. Thus processes in which a proportion of the component in the feed is extracted as un-charged components in the process whilst the majority of that component continues into the product stream produced from the charged components is envisaged. The upgrading of fuel material, by separating out a small portion of the $^{238}$U present in the feed is envisaged as one example of this type of process.

Of course the un-charged first or second product stream may constitute the useful and aimed for separated component as much as the final end product from the charged component.

According to an eighth aspect of the invention we provide a fuel pellet, fuel rod or fuel assembly for a nuclear reactor incorporating the product, or a further processed product, of any of the first to seventh aspects of the invention.

BRIEF DESCRIPTION OF THE DRAWINGS

Various embodiments of the invention will now be described, by way of example only, and with reference to the accompanying drawings in which.

DETAILED DESCRIPTION OF THE PREFERRED EMBODIMENTS

The various principles involved in the invention are illustrated below with regard to the preparation of certain elements, compounds or isotopes of specific materials. However, the general principles and features outlined in the embodiments are transferable between the various embodiments as desired. The invention is suitable for handling a wide range of starting materials with a view to producing a wide range of potential products in each case.

Isotopic Enrichment of Uranium From Uranyl Nitrate Hexahydrate Feed

Figure 1:
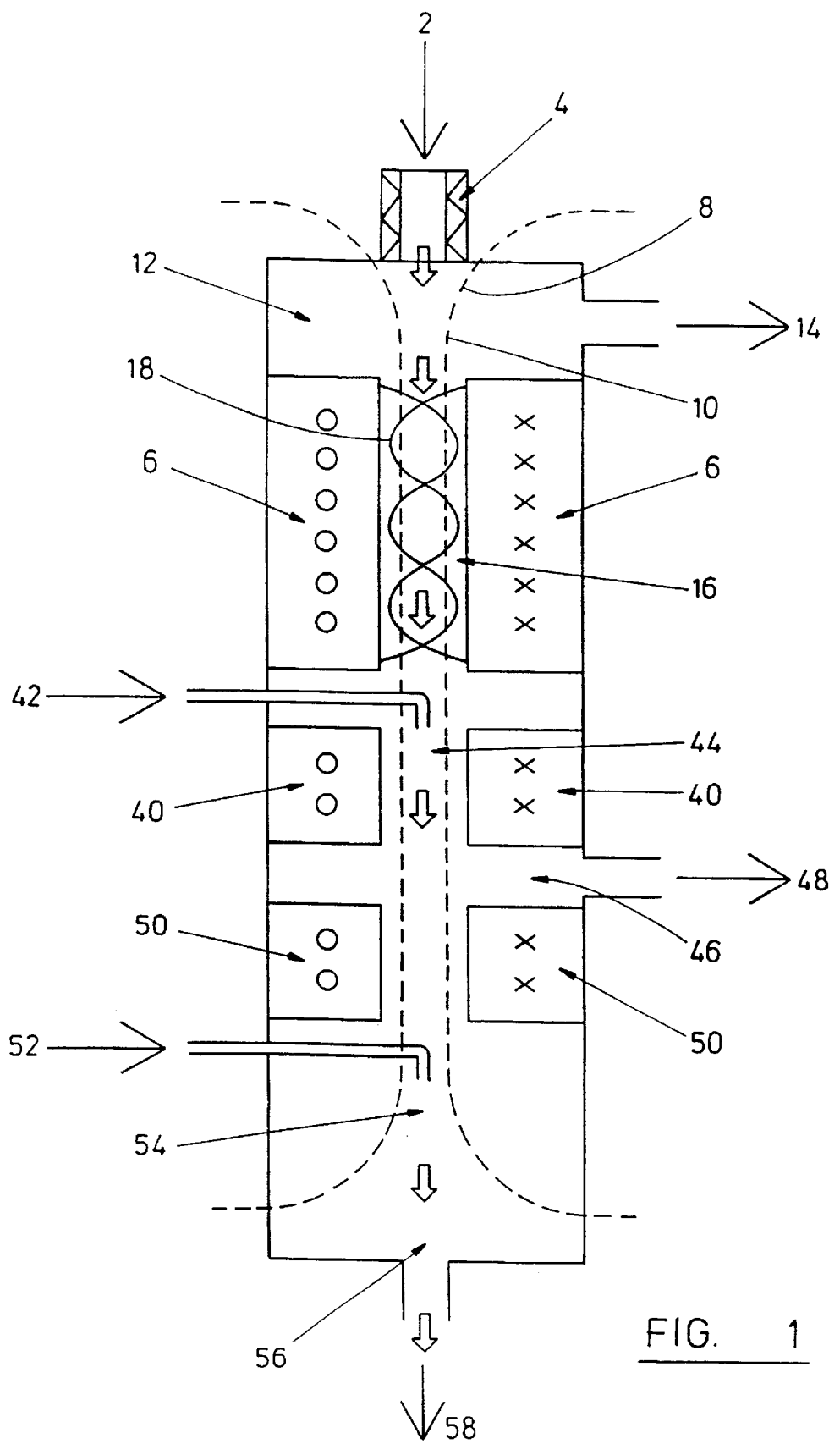
FIG. 1 illustrates schematically a first embodiment of the invention.

As illustrated in FIG. 1 the feed to be processed is introduced according to arrow 2. In this particular example the feed material consists of a uranyl nitrate hexahydrate feed liquor. Such a feed is typical of an early stage in the extraction of uranium from a primary source. The feed liquor passes through a plasma generator (4) which rapidly heats the feed liquor to around 4000K. The plasma generator (4) may be a microwave or RF type plasma generator. Control of the plasma temperature can readily be provided.

Super conducting solenoids in array (6) produce a high intensity magnetic field whose lines of force are schematically represented (8).

The super conducting magnets are set to produce a field intensity in excess of 0.1 tesla in locations (12), (44), (46), (54) but to provide at intensity of 0.5 to 6 Tesla in location (16).

As a consequence of the plasma generator (4) the feed material enters chamber (12); highly elevated temperature. At this temperature the uranyl nitrate hexahydrate breaks down into its component atoms.

Figure 2:
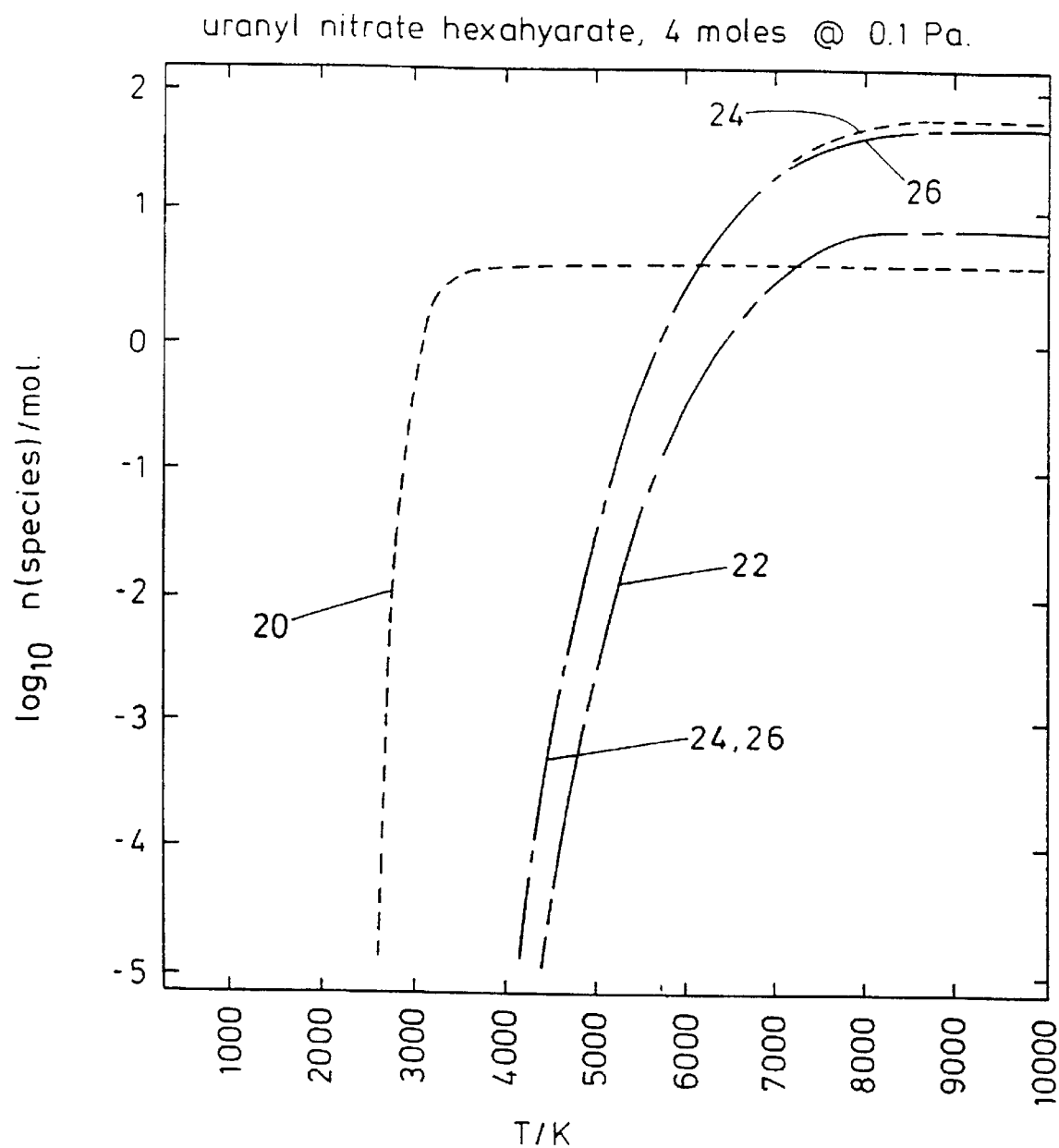
FIG. 2 illustrates a phase diagram for uranium, oxygen, nitrogen and hydrogen.

As can be seen from the phase diagram provided in FIG. 2 at 4000K and under the type of conditions experienced in chamber (12) uranium atoms are charged, U+, line 20. Conversely at this temperature the bulk of the nitrogen, oxygen, and hydrogen are un-charged atoms or molecules as seen by the lines of FIG. 2 which represent the nitrogen, N, line 22; oxygen, O, line 24; and hydrogen, H, line 26; ions all in gaseous form.

As charged particles the uranium ions are contained by the magnetic field and pass onward through the super conducting solenoids (6). The uncharged nature of the nitrogen, oxygen and hydrogen atoms allows them to move freely, unfettered by the magnetic field and they can consequently be "pumped" out of the chamber (12), arrow (14).

Subsequent cooling of the stream (14) allows these materials to fall back into a recombined equilibrium giving $N_2$, $O_2$ and $H_2O$, $NO_X$.

As a consequence of this aspect of the process the uranium has been separated from the other elements forming the uranyl nitrate hexahydrate feed.

The strong uniform field present in portion (16) of the process strictly confines the uranium ions. However, as charged particles moving in a magnetic field the particles are subjected to a force which in effect causes them to spiral as they pass through portion (16) of the apparatus. The natural frequency of the spiralling of a given ion depends solely on its mass and its charge as well as the magnetic field strength. Thus $^{235}U$ ions spiral at a different natural frequency from $^{238}U$ ions.

By providing a radio frequency aerial (18) in portion (16) and applying an oscillating electrical field which is tuned to the natural frequency of $^{235}U$, the least abundant species compared with $^{238}U$, ions of this isotope can be caused to gain more energy than the $^{235}U$ ions. As a consequence of this energy input, which can be thought of in terms of heating, the $^{235}U$ particles travel faster. The frequency of spiralling remains the same for the $^{235}U$ ions and the increased velocity of these ions results in the radial extent of the spiral increasing.

Thus, even allowing for the inevitable collisions between $^{238}U$ and $^{235}U$ particles and the consequent transfer of energy the two ion species form groups with different kinetic energy levels.

Further super conducting solenoids (40) or a continuation of the first (6) continue to restrain the uranium ions in a strong field. By introducing an oxygen feed (42) to portion (44) of the process an effective separation of the $^{235}U$ from $^{238}U$ can be affected.

Due to the additional energy imparted to $^{235}U$ by the RF aerial (18) $^{235}U$ particles by the time they reach portion (44) have an energy of around 5 ev (equivalent to 40,000K). By introducing relatively cool oxygen at around 2000K $^{235}U$ ions coming together with the oxygen result in particles having an equivalent temperature of around 4000K.

$^{238}U$ ions on the other hand exiting the portion (16) of the process are present at a much lower energy level as little additional energy has been imparted to these ions. As a consequence, the coming together of $^{238}U$ ions at an equivalent energy of less than 2.5 eV (20,000K) and the oxygen at 2000K results in a combination equivalent to less than 3000K.

As a result of the different energy levels and the limited residence time/path the predominant forms resulting are $^{235}U^+$ and $^{238}OU_2{}^{3O}$. Contact of these species with free electrons results in $^{238}U+O$ and $^{235}U+$ predominating. The residence time/path involved are sufficient for $^{235}UO_2{}^+$ conversion to $^{238}UO$, but $^{235}U$ only arises after several metres rather than the few cm's provided.

Thus the $^{235}U$ isotope leaves portion (44) and enters chamber (46) as a charged ion, whereas the $^{238}U$ isotope leaves portion (44) and enters chamber (46) as an uncharged gas, uranium oxide. The continuing magnetic field of the super conducting magnet arrays (40, 50) constrains the $^{235}U$ ions to ensure their continuing passage through the apparatus. The uncharged $^{238}U$ oxides are no longer constrained by the magnetic field and can be "pumped" from the process, line 48 as a gas.

In order to stop condensation of the $^{238}U$ oxide gas in this stream (48) the outlet should be maintained at a suitably high temperature, i.e. in excess of 2000K, but ideally not above 2600K. Alternatively the surface chemistry must be adjusted to maintain the energy of the $^{238}U$ oxide gas. To this end, it is believed that a steady state can be reached after a period of operating the process at which $^{238}U$ oxides which have already condensed can provide the necessary surface chemistry and heat retention to avoid further condensation. Condensation can of course be tolerated at locations within the process which are accessible.

As any excess of oxygen introduced to the chamber (46) is still provided at a temperature below which it ionises it also is extracted via pumping into stream (48).

As a consequence of this further processing step therefore the material passing through super conducting solenoids (50), or a continuation of the first (6) or second (40), consists almost exclusively of $^{235}U$ in charged form.

Figure 3:
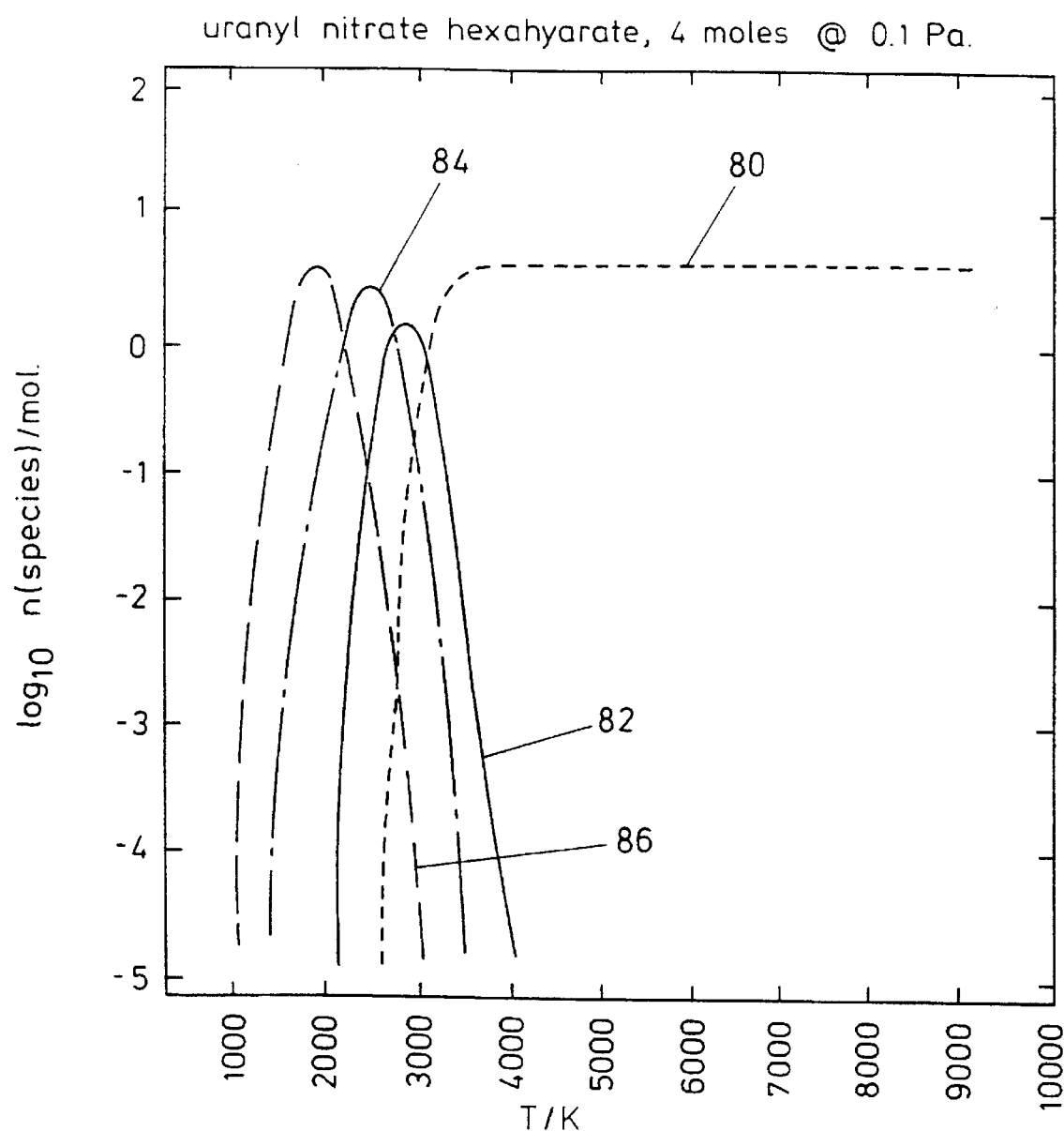
FIG. 3 is a phase diagram for U+, UO, $UO_2$ and $UO_3$.

Introduction of a further oxygen stream (52) to portion (54) of the process leads to quenching of the $^{235}U$ ions. By controlling the quench a reduction in temperature to 2500K can be affected. At this temperature as can be seen from FIG. 3 the predominant form of the material is $^{235}UO_2$ gas in an uncharged stage, although other uranium oxide forms are likely to be present to a lesser degree.

By applying a further quenching stage (56) the temperature can be reduced still further and the uranium oxide rapidly brought from a gaseous state into a solid state in the form of a fuel grade ceramic powder. The conditions for the stages are carefully controlled to provide the desired size and shape distributions for a sinterable product.

The process thus provides in a single modular unit for the conversion of uranyl nitrate hexahydrate reed liquor into fuel grade ceramic powder suitable for pelletisation thereafter.

A single modular unit corresponding to this process having an overall length of approximately 10 m and an active region of about 1 m in diameter can process between 1 and 10 kg/hr of feed uranium.

Residence time within the unit is very low, in the order of 10 ms. This time is a reflection of the theoretical speed at which uranium ions travel at 4000K i.e. $6 \times 10^4$ cm/s.

In the embodiment discussed above the use of the process, for instance to convert natural uranyl nitrate hexahydrate into fuel grade materials has been provided. The technique has application in many other processing areas including reprocessing products from used fuel rods to extract the desired components, a variety of different fuel cycles and a variety of different initial feeds.

Upgrading Re-Processed Fuel Material

Spent fuel consists principally of $UO_2$ powder in combination with various fission products, low levels of $^{235}U$ and plutonium. By processing this material into a nitrate liquor and introducing the liquor to the general process described above the following separations can be affected.

In the initial chamber (12) following plasma generation the $^{235}U$, plutonium isotopes and $^{238}U$ (which makes up most of the fuel) all ionise. The lighter weight, fission products, as well as N, H, O, remain mostly in an non-ionised state and consequently are not constrained by the magnetic field. Pumping of these materials out into stream (14) is thus possible.

It is then possible to separate adequately the $^{238}U$, $^{235}U$ and plutonium isotopes from one another in the technique described above and so achieve a reactor grade material. As the spent fuel material normally includes 1% $^{235}U$ and 1% plutonium only a half to two thirds removal of $^{238}$U from this is needed to up the grade to the required 5% fissile content.

However, by applying more than one oscillating electrical field to the radio aerial, input of energy to more than one isotope in portion (16) of the process is possible. Thus increased energy levels can be provided for $^{235}$U and/or Pu$^{241}$ and/or Pu$^{238}$ so as to separate them from the $^{238}$U in the manner described above.

The higher energy levels possessed by $^{235}$U and the selected plutonium isotopes ensures that these materials remain in the ionised state following the quenching step at portion (44) whereas the $^{238}$U and unselected Pu isotopes can be removed as uncharged gas as described above.

The production of pellets containing $^{235}$U and other desired fissile Pu isotopes at enhanced concentrations can be provided in stream (58) by quenching to return these components to the uncharged solid state.

Careful control of the amount of energy applied to $^{238}$U during the transition through portion (16) can be used to ensure that sufficient $^{238}$U is retained in this stream (58) so as to ensure that the fuel is of the desired constituent parts.

Alternatively control of the oxygen quench at (44) can be used to only turn a fraction of the $^{238}$U$^+$ to $^{238}$U oxides.

Alternative Plasma Generation

Figure 4:
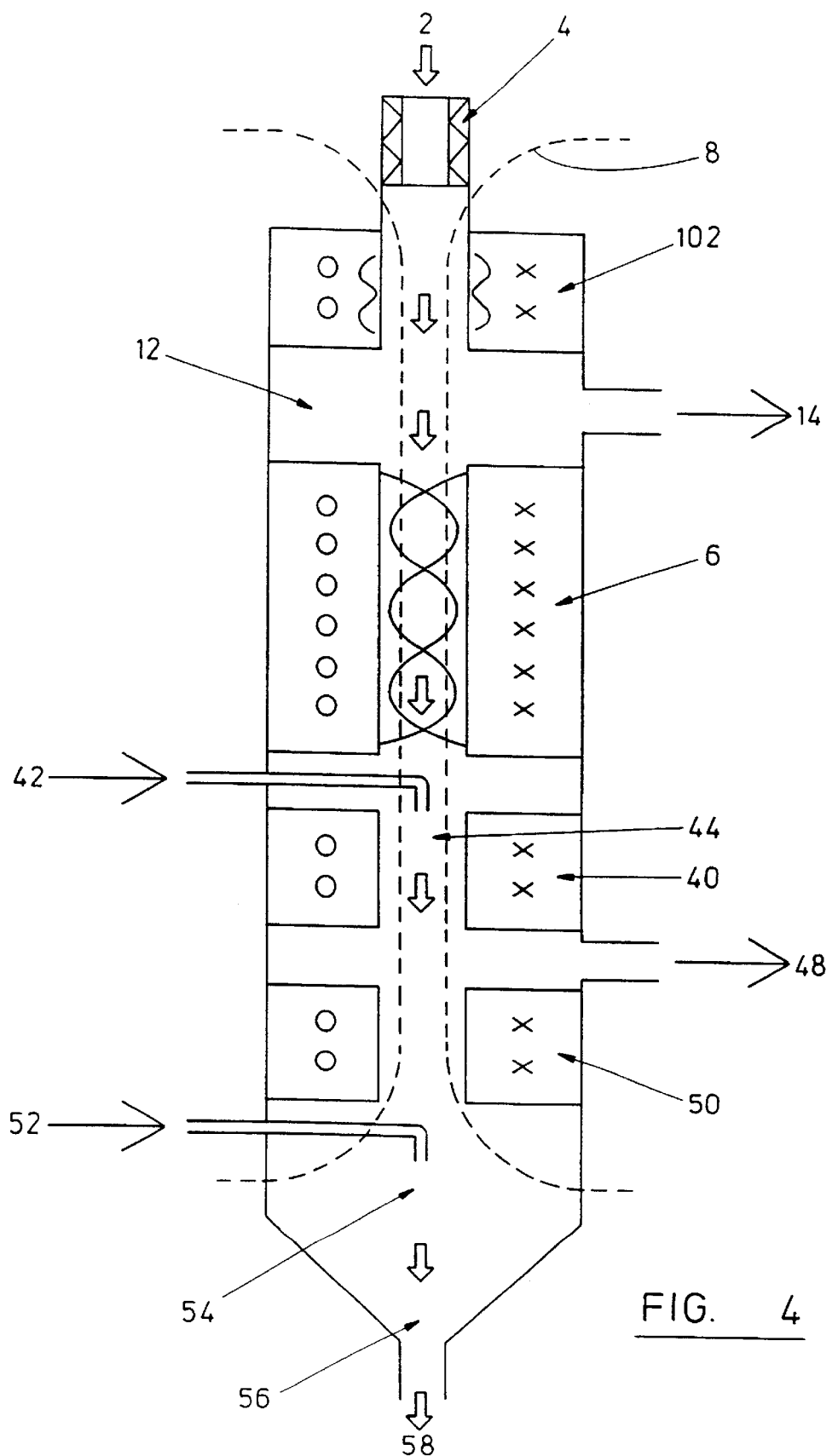
FIG. 4 schematically illustrates a second embodiment of the invention.

As illustrated in an alternative embodiment in FIG. 4 the feed material may be provided with an additional system to provide or ensure the required ionisation of the selected component.

In this unit the feed (2) passes through a plasma generator (4) and into a containing magnetic field (8).

The plasma temperature is such that the feed materials are reduced to discrete atoms.

In this form the feed then passes through an electron cyclotron resonance unit (102) which causes ionisation of the selected components due to the collision of high energy electrons with the components. As with the phase diagrams previously suggested at the energy level of collision provided certain selected components are ionised whereas others are retained in un-ionised form.

Ionised to the relative extent the material then passes into chamber (12) where the un-charged materials can be removed from the magnetic field as process stream (14).

The remaining components and processing steps are as presented in FIG. 1 and are designated by the same references.

Selective Excitation Separation of Uranium Isotopes

Figure 5:
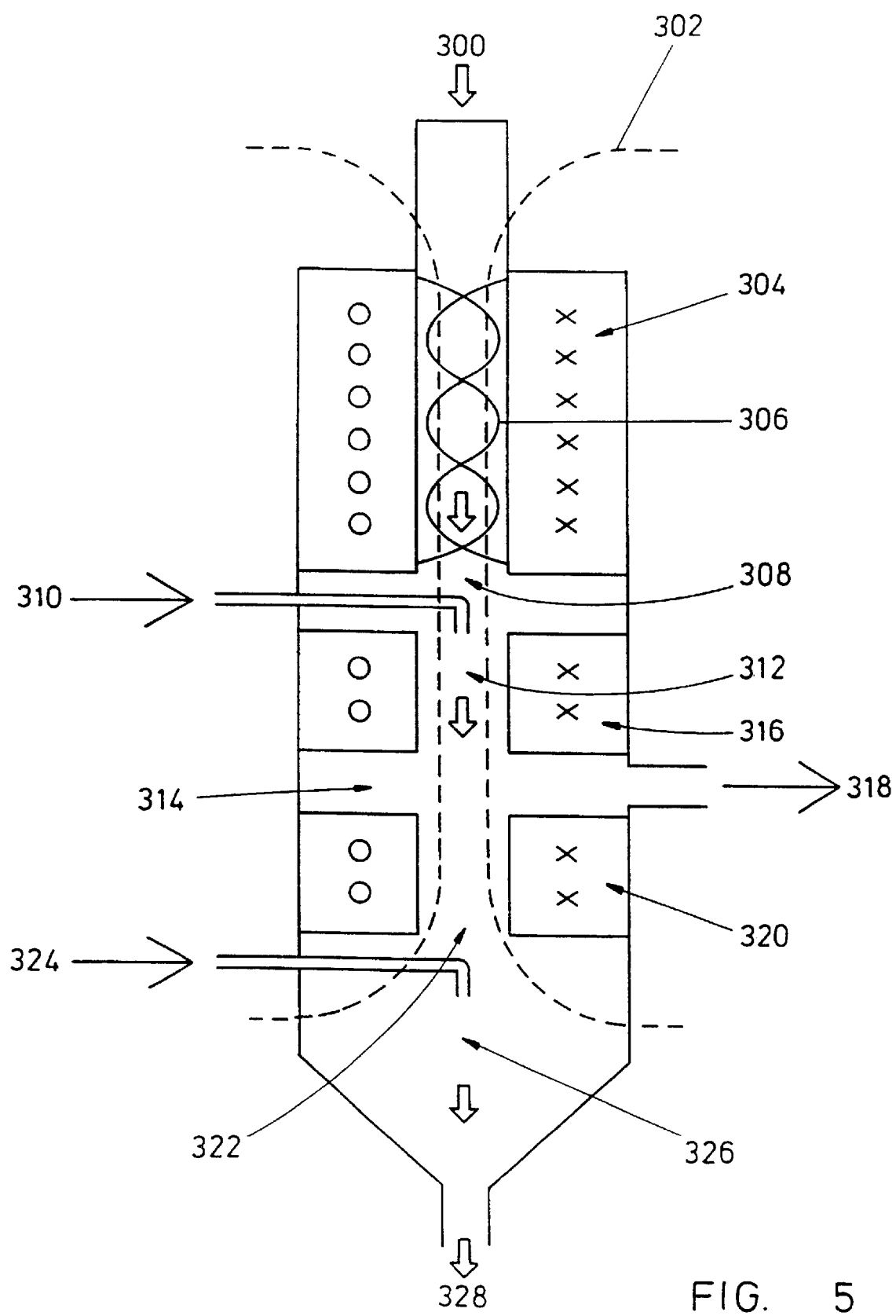
FIG. 5 schematically illustrates a third embodiment of the invention.

The embodiment illustrated in FIG. 5 offers a convenient technique for the separation of one or more components of the feed from one or more other components using selective increases in energy levels for the components followed by a selective chemical reaction or phase change producing charged and un-charged components which can be separated.

The feed material (300) may consist of different isotopes of one element or different elements or different isotopes of more than one element. The feed (300) is provided in ionised form and the ions are contained within magnetic field (302). Ionisation can be affected by any way of a number of means including plasma generation, electron cyclotron resonance, laser excitation, and spluttering for instance.

A strong linear magnetic field alignment is provided by magnets (304). Within this field the components are subjected to ion cyclotron resonance using an RF aerial (306). The frequency of the RF signal is such that one or more components of the feed (300) have their energy levels raised substantially whilst the other components remain at their input energy level or levels not substantially greater than that. The species selected for excitation is the one in least abundance. Thus by using a suitable frequency $^{238}$U$^+$ and $^{235}$U$^+$ can be given quite different energy levels by the time they reach location (308) in the process stream.

Introduction of oxygen through stream (310) into the apparatus gives rise at location (312) to a selective conversion of the low energy level component into un-ionised form whilst the high energy level components remain in ionised form. Dissociative recombination gives rise to $^{238}$UO and $^{235}$U$^+$, for instance, where $^{235}$U is excited to a higher energy level than $^{238}$U first. Thus in chamber (314) the un-ionised components can be pumped out from the chamber into stream (318) whilst the other products continue constrained by magnets (320) on to location (322).

The introduction of a further chemical material (324) gives rise to a rapid quenching of the charged component converting it very rapidly indeed from a charged gaseous state into an un-charged solid state. This then forms the product stream (328).

The selective quenching and phase alteration enables careful control of both the product grade and of its physical and chemical form.

Alternative Selective Separation of Uranium Isotopes

Figure 6:
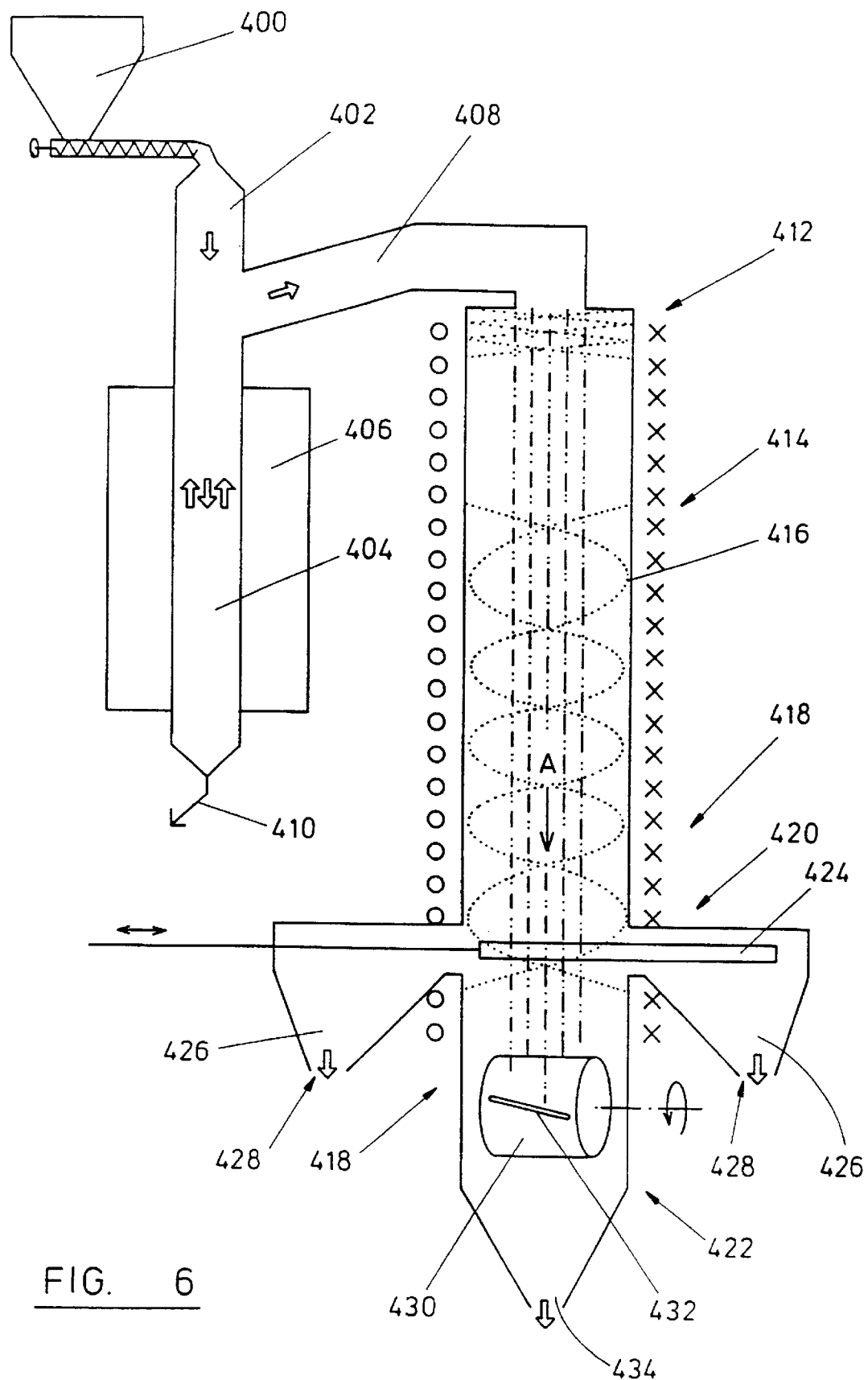
FIG. 6 schematically illustrates a fourth embodiment of the invention.

A further alternative embodiment of the invention is provided in FIG. 6. The feed from hopper (400) is UO$_2$ in powder form. This is fed into a vertical shaft (402) down which the powder falls. A high level of heat input is channelled into the middle section (404) of the passage from furnace (406). The furnace may provide energy input through radiation heating and/or microwaves. The heat input results in the UO$_2$ vaporising to give UO$_2$ gas. The powder is heated to above 2200K at around 1Pa to achieve the desired vaporisation. The UO$_2$ vapour passes up the tube (402) and through into cross passage (408) leading to the rest of the apparatus. Ash in the feed, which may consist of impurities and/or a proportion of UO$_2$ not vaporised, falls to the bottom of the passage (402) from where it is collected and dispensed as stream (410.

The vapour travelling through cross passage (408) enters the top of the separator as a non-charged gas. It is fed initially into the constraints of a magnetic field and then subjected to an electron cyclotron resonance unit (412) to promote ionisation of the UO$_2$ to UO$_2$$^+$. Both the U$^{235}$ and U$^{238}$ isotopes of the uranium dioxide are ionised, each remaining substantially in the molecular form.

The ionised gas, now contained within the magnetic field due to its electrical charge passes on down the unit into the ion cyclotron resonance unit (414) which is provided with aerial (416). An approximately 150 kHz RF field and approximately 2 Tesla magnetic field is provided.

In a manner discussed above the ICR unit is selectively tuned to give rise to preferential excitation of the $^{235}$UO$_2$$^+$ molecules rather than the $^{238}$UO$_2$$^+$ molecules. Very little free O arises, but that which does tends to be uncharged and may separate from the contained uranium oxide stream as a result.

The excitation and magnetic fields give rise to a generally spiral path down the apparatus for the molecules. The diameter of the spiral is related to the energy of a given molecule and hence the $^{235}UO_2^+$ molecules attain paths of greater diameter than the $^{238}UO_2^+$ molecules.

The preferentially excited molecules then enter collection assembly (418) in the lower part of the apparatus. This section of the apparatus provides for collection of the preferentially excited component in general unit (420) and to collection of the preferentially less excited component in general unit (422).

The collection apparatus (420) for the higher energy components consists of a lattice like grid (424) which is movably mounted within the material stream. The collector grid (424) is made up of a series of plates arranged substantially parallel to the flow of the material, arrow A. A square lattice or alternative form may be provided. The spacing of the plates in the lattice is set such that the plates will, on average, clash with the spiralling path followed by $^{235}UO_2^-$ molecules, but sufficiently large that they will not, on average, interfere with the majority of $^{238}UO_2^-$ molecules. These tend to continue on their downward path beyond the grid (424) towards the collection apparatus (422)

A fixed electrical potential is applied to the collector grid (424) so as to neutralise the electrical charge carried by the $^{235}UO_2^+$ molecules on contact. This results in uncharged $^{235}UO_2$ molecules which are collected on the grid in solid form.

The preferential collection of the high energy components may be assisted by providing an electrical bias of a few volts on the grid. This electrostatic effect has little influence on the high energy components, but assists in repelling the low energy components away from the plate of the collection grid.

Periodically the grid (424), can be moved horizontally so as to present a different portion of the grid to the flow of material and to position the portion of the grid (424) previously in the material flow to one side over product hoppers (426). The material collected on the grid can be removed at these locations so as to discharge into product streams (428). This product stream is enriched in $^{235}UO_2$.

The $^{238}UO_2^+$ molecules which pass through the collector grid (424) are still charged and as a consequence are still contained by the magnetic field. These are directed on to the collecting apparatus (422) which in this case consists of a rotating drum (430). The drum is relatively cool and provided with a fixed potential so as to result in electrical discharge of the $^{238}UO_2^+$ molecules to $^{238}UO_2^+$ molecules. The cooling also results in these molecules converting from the gaseous to solid state.

Rotation of the drum (430) relative to scraper blade (432) promotes the drop off of the powder to $^{238}UO^2$ product stream (434).

Combined Selective Ionisation and Selective Excitation Process

Figure 7:
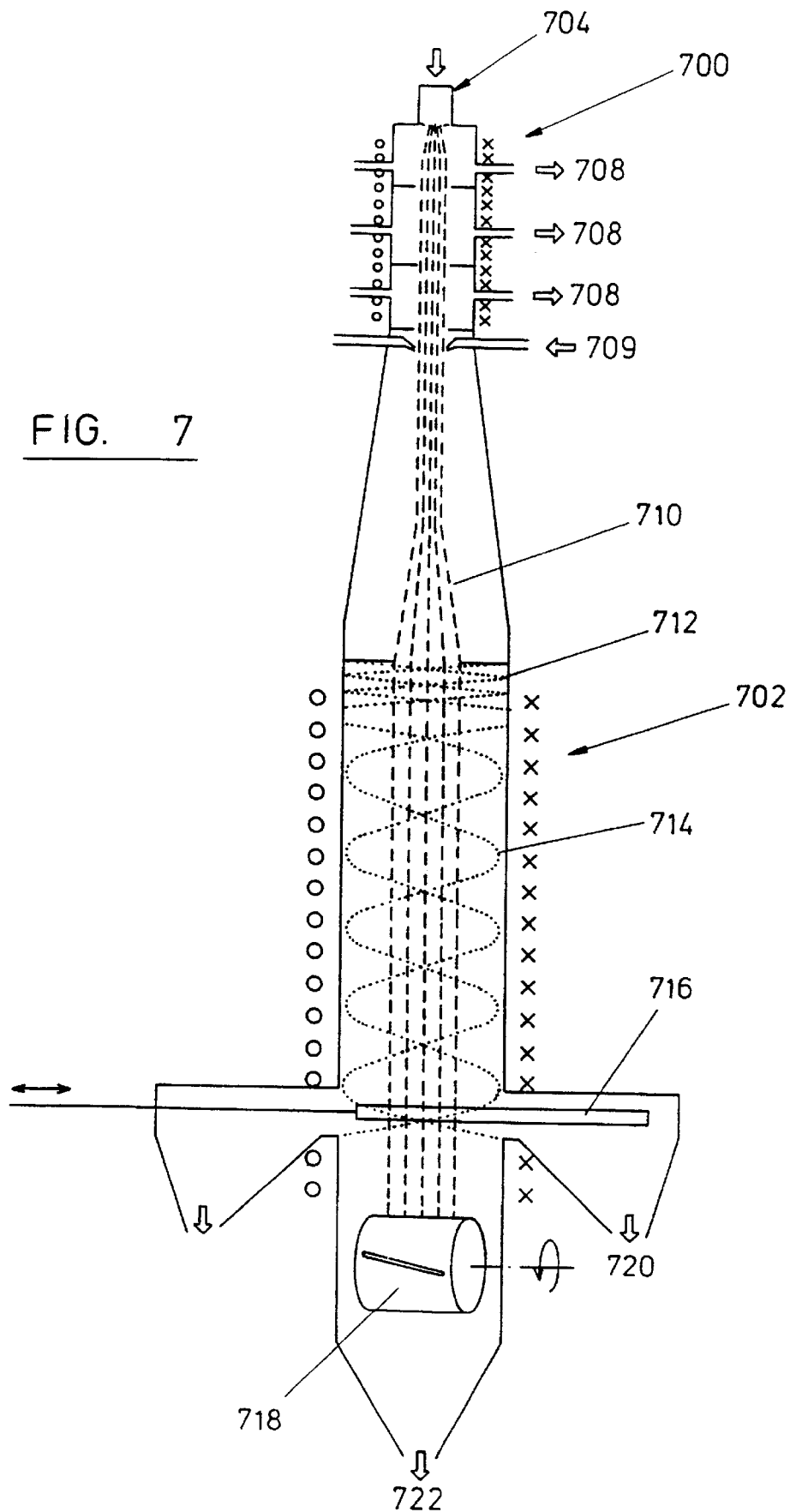
FIG. 7 schematically illustrates a illustrates a fifth embodiment of the invention including a selective ionisation based separation and a selective excitation based separation.

FIG. 7 illustrates a further embodiment of the invention in which a selective ionisation and separation process (700) is combined with a selective excitation and separation process (702).

The feed to the selective ionisation process (700) is converted to an atomic form as outlined above in a plasma generator (704). Lower weight atoms, such as oxygen, nitrogen and hydrogen are rendered as discrete atoms, but remain unionised. The heavier atoms, in this case uranium, are ionised. In the unit (700), therefore, un-ionised and ionised particles are present in jet (706). The un-charged species are not contained by the magnetic field and can be removed as product streams (708). The uranium on the other hand is charged and as a consequence is retained within the magnetic field. Where necessary additional energy is inputted to this unit (700) to maintain the uranium in ionised form throughout the unit (700).

At the end of this stage the ionised process stream is injected with cold oxygen gas (709) to discharge the ionised stream and give rise to uranium dioxide in uncharged gaseous form. The discharge is affected by the following general mechanism. Uranium ions within the stream collide with the added oxygen. Due to the energy exchange which results from the collision the equilibrium form resulting is UO2+ ions. UO2+ ions offer many more potential levels of excitation than U+ ions. As a result collisions between the molecular ions and free electrons within the plasma are far more likely to lead to discharge than is true for collisions between U+ ions and free electrons. The energy of the electron may be absorbed by the excitation of the molecule and/or may be absorbed by an oxygen given out from the molecule, UO, un-ionised may therefore result. The neutral process stream is then allowed to expand in section (710).

The selective ionisation process is operated at a relatively low, magnetic field strength approximately 0.1 Tesla, whereas a far higher, and hence more costly to achieve, level is needed for the selective excitation process. To avoid having to operate the selective ionisation part of the process at this unduly high field strength and yet to provide a ready transition from one process to the other the neutralisation stage is used.

Once within the stronger magnetic field the process stream is substantially and/or completely ionised by an electron cyclotron resonance unit (712).

Within the confines of the magnetic field the ions are then subjected to ion cyclotron resonance. The energy level imputed to the different isotopes is controlled by the frequency applied to the aerial (714) as outlined above.

Due to the selective excitation occurring within this zone (702) the 235U isotope, in the form of uranium oxide, is imparted with a higher energy level than the 238U isotope, also in uranium oxide form. The uranium oxide may be UO2, UO or mixed oxide forms. The higher energy level component is then collected on grid (716) by the process outlined above, with the lower energy level component being collected on a quench drum (718).

A product stream (720) of UO2, enriched in 235U, and a product stream (722) of UO2, depleted in 235U, arise as a result.

Figure 8:
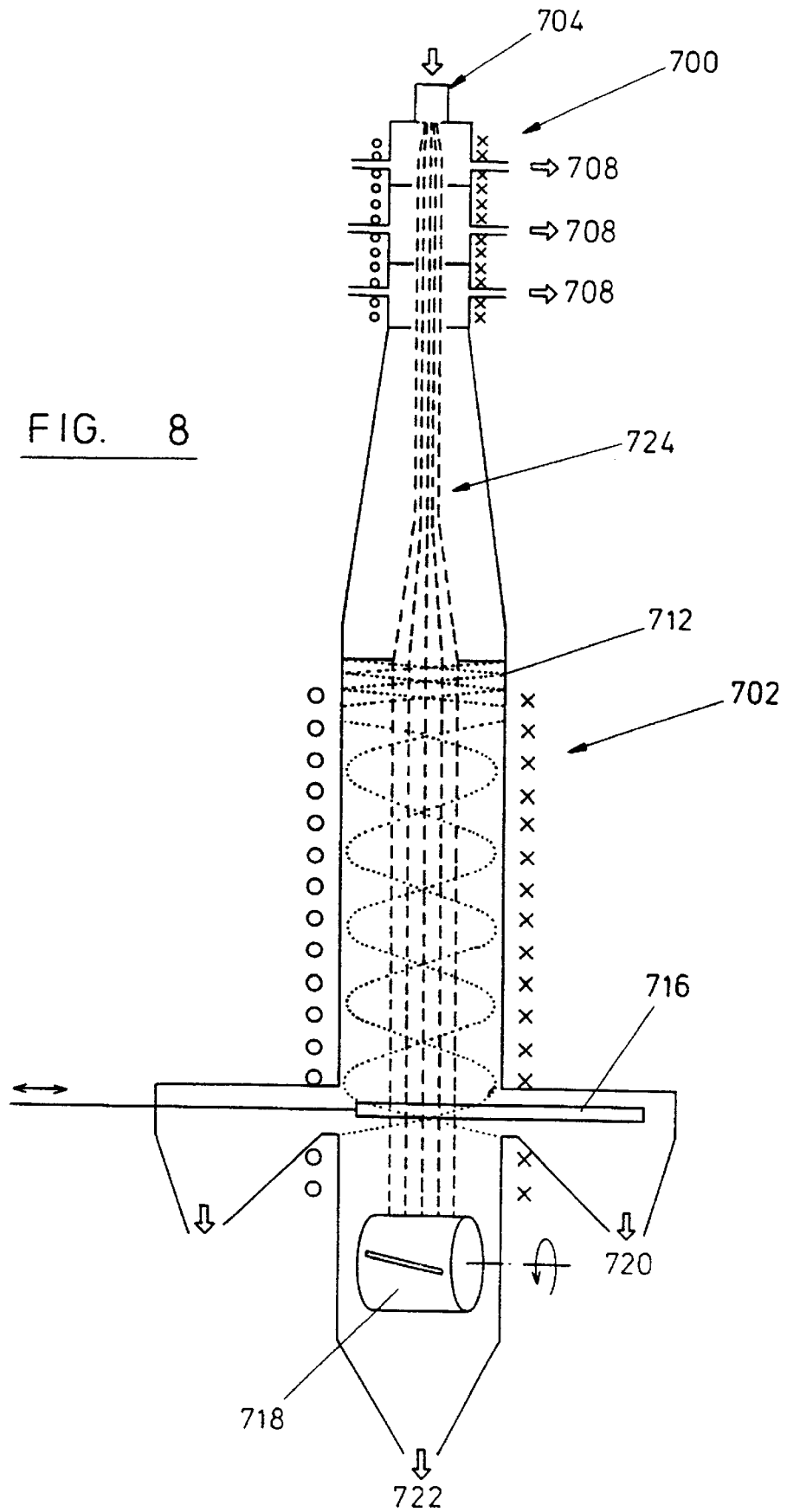
FIG. 8 schematically illustrates a further combined embodiment of the invention.

In a further embodiment of the invention illustrated in FIG. 8 the plasma generator (704) is controlled to produce selective ionisation of the feed to give molecular UO2+ ions and non-charged atomic and/or elemental forms of the other elements making up the feed, i.e. oxygen, nitrogen and hydrogen.

The ions are contained within the magnetic field and the non-charged species can be removed as product streams (708).

The remaining ionised process stream, UO2, is allowed to cool due to interparticle interactions and radiation to the environment in zone (724) and as a consequence falls back to neutral uranium dioxide form as process stream (710).

The jet is once again allowed to expand and renters a stronger magnetic field prior to reionisation using an electron cyclotron resonance unit (712). The completely ionised species are then subjected to selective excitation using ion cyclotron resonance unit (714) and collected on grid (716) and drum (718) as outlined above for FIG. 7.

The various embodiments set out herein are closely related to each other and it should be appreciated that features discussed explicitly with regard to one or more aspects or embodiments are applicable to the others also.

What is claimed is:

1. A process for separating one or more ionized components at elevated kinetic energy from one or more components at lower kinetic energy, the process comprising providing a process stream containing the elevated and lower kinetic energy components; introducing a chemical material to the process stream and wherein the introduced chemical material contacts both the elevated and lower kinetic energy level components; contact with the elevated kinetic energy components resulting in a still ionized form of that component and contact with the lower kinetic energy component resulting in a non-ionized form of that component, the separation being based on the ionized and/or non-ionized state of the components.

2. The process of claim 1 where the elevated and lower energy level for the components are provided using ion cyclotron resonance.

3. The process of claim 1 wherein the added chemical material consists of an un-ionized gas.

4. The process of claim 1 and comprising the further step of introducing a further chemical material and contacting this with the remaining ionized component, the kinetic energy of the ionized component and further chemical material being such that a non-ionized component or particle results.

5. The process according to claim 4 wherein introducing the further chemical material and/or a further additional chemical material to the component reduces the kinetic energy to a stage where a solid product is produced.

6. The process according to claim 1 wherein ionization of the components is caused by the temperature of a plasma and/or the interaction of the components with high energy electrons produced by electron cyclotron resonance.

7. The process according to claim 1 wherein the chemical material added at a predetermined kinetic energy comes into contact with the elevated energy component and into contact with the lower energy component; the kinetic energy of the chemical material, elevated energy component and lower energy component being such that contact between the elevated energy component and the chemical material results in an ion of, or including, that component; and the coming together of the lower energy component and the chemical material results in a non-ionized particle of, or including, that component.

8. The process of claim 7 wherein the amount of the chemical material added to the process is selected to control the extent to which the lower energy component is converted to the non-ionized form.

9. The process of claim 1 wherein the separated component is one or more isotopes which have been separated from other isotopes of the same and/or other elements.

10. The process of claim 1 wherein the degree of separation between the components is only partial, such that a proportion of the component in the feed is extracted as nonionized components in the process whilst the majority of that component continues into the product stream produced from the ionized components and/or vice versa.

11. A process according to claim 1 and further comprising the preliminary steps of:
a) providing a feed, the feed consisting of mixed components;
b) converting said feed into a plasma and/or ionized form;
c) providing at least one component in at least partially ionized form and at least one different component in at least partially non-ionized form;
d) containing said ions and/or plasma in a magnetic field; and
e) separating at least a portion of said ionized components from at least a portion of said non-ionized components, and wherein the separated ionized components and/or separated non-ionized components are then separately subjected to a process according to claim 3.

12. The process according to claim 1 comprising the step of applying an oscillating electric field to the ionized component, the oscillating electric field having a component perpendicular to the axis of a containing magnetic field, the electric field oscillating at a frequency close to the ion cyclotron frequency, or an harmonic thereof, of one or more components or one or more isotopes of a component present.

13. The process according to claim 12 in which the ionized components from the separation of claim 11 are neutralised prior to entering the containing magnetic field of claim 12.

14. The process of claim 13 in which the addition of a chemical material effects the neutralisation of the ionized components.

15. The process according to claim 13 in which the neutralised components are at least partially ionized following entry to the containing magnetic field.

16. The process of claim 1 wherein the added chemical material is oxygen.

17. The process of claim 1 wherein the mixed components of the feed contain $^{238}U$ and $^{235}U$.

18. The process of claim 17 wherein the $^{235}U$ is solidified under conditions of pressure, temperature, chemical addition and collection method to give ceramic grade uranium dioxide.

19. The process according to claim 1 in which the process is used to remove fission products from spent nuclear fuel.

20. The process according to claim 1 in which the process is used to remove specific plutonium and/or uranium isotopes from spent nuclear fuel.

21. A process comprising the steps of:
providing a feed of mixed components in a magnetic field, the mixed components including ionized first components and ionized second components, the ionized first components and the ionized second components each having an average kinetic energy;
increasing the average kinetic energy of the ionized first components and the ionized second components so that the average kinetic energy of the ionized first components is greater than the average kinetic energy of the ionized second components;
introducing a chemical material into the feed of mixed components, the chemical material interacting with the ionized first components and the ionized second components such that a majority of the ionized second components become non-ionized, a majority of the ionized first components remaining ionized; and
substantially separating the remaining ionized first components from the non-ionized second components.

22. The process of claim 21 where the act of increasing the average kinetic energy of the ionized first components and the ionized second components is accomplished using ion cyclotron resonance.

23. The process of claim 21 wherein the chemical material consists of an non-ionized gas.

24. The process of claim 21 comprising the further act of introducing a further chemical material to the separated remaining ionized first components, the kinetic energy of the remaining ionized first components and further chemical material being such that a non-ionized component or particle results.

25. The process according to claim 24 wherein the act of introducing the further chemical material to the remaining ionized first component reduces the kinetic energy of the first component to a stage where a solid product is produced.

26. The process according to claim 21 wherein the first components and second components are initially ionized by the temperature of a plasma or the interaction of the components with high energy electrons produced by electron cyclotron resonance.

27. The process according to claim 21 wherein the chemical material added at a predetermined kinetic energy comes into contact with the ionized first component and into contact with the ionized second component; the kinetic energy of the chemical material, ionized first component, and ionized second component being such that contact between the ionized first components and the chemical material results in a ion of, or including, that first components; and the coming together of the ionized second component and the chemical material results in a non-ionized particle of, or including, that the second component.

28. The process of claim 27 wherein the amount of the chemical material added to the process is selected to control the extent to which the ionized second component is converted to the non-ionized form.

29. The process of claim 21 wherein the separated first components are one or more isotopes which have been separated from other isotopes of the same or other elements.

30. A process according to claim 21 and further comprising the preliminary acts of:
providing a feed, the feed consisting of mixed components;
converting said feed into a plasma and/or ionized form comprising at least one component in at least partially ionized form and at least one different component in at least partially non-ionized form;
containing said ions and/or plasma in a magnetic field; and
separating at least a portion of said ionized components from at least a portion of said non-ionized components, and wherein the separated ionized components or the separated non-ionized components are then separately subjected to the process according to claim 1.

31. The process according to claim 21 wherein the act of increasing the average kinetic energy comprises applying an oscillating electric field to the ionized first and second component, the oscillating electric field having a component perpendicular to the axis of the containing magnetic field, the electric field oscillating at a frequency close to the ion cyclotron frequency, or an harmonic thereof, of the first or second components or one or more isotopes thereof.

32. A process comprising the steps of:
subjecting a feed of mixed components comprising ionized $^{235}U$ and ionized $^{238}U$ to ion cyclotron resonance, the ion cyclotron resonance causing the ionized $^{235}U$ to have an average kinetic energy that is greater than an average kinetic energy of the ionized $^{238}U$;
introducing a chemical material into the feed of mixed components, the chemical material interacting with the $^{235}U$ and $^{238}U$ so as to leave at least a portion of the $^{235}U$ of the feed in ionized form and at least a portion of the $^{238}U$ of the feed in non-ionized form;
substantially separating the ionized $^{235}U$ from the non-ionized $^{238}U$; and
solidifying the separated $^{235}U$ to give ceramic grade uranium dioxide.

33. A process comprising the steps of:
providing a feed of mixed components in a magnetic field, the mixed components including ionized first components and ionized second components, the ionized first components and the ionized second components each having an average kinetic energy;
increasing the average kinetic energy of ionized first components and the ionized second components so that the average kinetic energy of the ionized first components is greater than the average kinetic energy of the ionized second components;
introducing a chemical material into the feed of mixed components so that the chemical material reacts with at least a portion of the ionized second components so as to form the at least portion of ionized second components into non-ionized third components, a majority of the ionized first components remaining ionized; and
substantially separating the remaining ionized first components from the non-ionized third components.

34. A process according to claim 33 wherein the act of introducing the chemical material comprises the chemical material being oxygen.

35. A process according to claim 33 wherein the act of introducing the chemical material comprises the chemical material having an average kinetic energy that is lower than the average kinetic energy of the first components and the second components.

36. A process according to claim 33 wherein the first components and the second components comprise isotopes of the same material.

37. A process comprising the steps of:
providing a feed of mixed components in a magnetic field, the mixed components including an ionized first component having a kinetic energy and an ionized second component having a kinetic energy, the first component and second component each consisting of a discrete atom or molecule;
increasing the kinetic energy of the ionized first component and the ionized second component, the kinetic energy of the first component being increased more than the kinetic energy of the second component;
introducing oxygen into the feed of mixed components so that the oxygen interacts with the ionized second component so that the second component becomes non-ionized, the ionized first component remaining ionized; and
separating the ionized first component from the non-ionized second component.

38. A process according to claim 37, wherein the act of the oxygen interacting with the ionized second component comprises the oxygen reacting with the second component so as to form a non-ionized third component.

39. A process according to claim 37, wherein the oxygen interacts with the second component to decrease the kinetic energy of the second component without reacting with the second component.

40. A process according to claim 37 wherein the first component comprises $^{235}U$ and the second component comprises $^{238}U$.

* * * * *

UNITED STATES PATENT AND TRADEMARK OFFICE
CERTIFICATE OF CORRECTION

PATENT NO. : 6,323,455 B1
DATED : November 27, 2001
INVENTOR(S) : Geoffrey Horrocks Bailey, Colin Whitehead and David John Witts It is certified that error appears in the above-identified patent and that said Letters Patent is hereby corrected as shown below:

Column 1,
Line 16, after "in" delete "."
Line 23, after "conversion of" change "$UF^6$" to -- $UF_6$ --

Column 3,
Line 1, after "$UO_2$" delete ","
Line 20, after "cooling" change "ot" to -- of --
Line 37, after "$^{235}UO_2$" delete ","
Line 38, before "and" change "$^{235}OU_2$," to -- $^{235}OU_2$, --

Column 4,
Line 61, before "affected" insert -- is --

Column 5,
Line 59, after "material" change ".ay" to -- may --

Column 6,
Line 1, after "be" change "neuzralised" to -- neutralized --

Column 7,
Line 7, after "ionisation" change "and or" to -- and/or --

Column 8,
Line 55, after "containing the" change "plasma ions;" to -- plasma/ions; --

Column 9,
Line 31, before "different" insert -- a --
Line 49, after "kinetically" change "preferably" to -- preferable --
Line 59, after "Both" change "charaed" to -- changed --

UNITED STATES PATENT AND TRADEMARK OFFICE
CERTIFICATE OF CORRECTION

PATENT NO.   : 6,323,455 B1
DATED        : November 27, 2001
INVENTOR(S)  : Geoffrey Horrocks Bailey, Colin Whitehead and David John Witts It is certified that error appears in the above-identified patent and that said Letters Patent is hereby corrected as shown below:

<u>Column 10,</u>
Line 65, after "components at" change "an" to -- a --

Signed and Sealed this

Twenty-ninth Day of April, 2003

JAMES E. ROGAN
*Director of the United States Patent and Trademark Office*